No. 792,034.

Patented June 13, 1905.

UNITED STATES PATENT OFFICE.

MARTIN HERZBERG, OF ELBERFELD, GERMANY, ASSIGNOR TO FARBEN-FABRIKEN OF ELBERFELD CO., OF NEW YORK, N. Y., A CORPORATION OF NEW YORK.

AZO DYE.

SPECIFICATION forming part of Letters Patent No. 792,034, dated June 13, 1905.

Original application filed January 12, 1905, Serial No. 240,777. Divided and this application filed March 20, 1905. Serial No. 251,142.

*To all whom it may concern:*

Be it known that I, MARTIN HERZBERG, doctor of philosophy, chemist, (assignor to the FARBENFABRIKEN OF ELBERFELD COMPANY, of New York,) residing at Elberfeld, Germany, have invented a new and useful Improvement in New Azo Coloring-Matters; and I hereby declare the following to be a clear and exact description of my invention.

The present application is a divisional application from my application, Serial No. 240,777, filed January 12, 1905, and is specifically the combination in alkaline solution.

I have found that new and valuable azo dyestuffs are obtained by first combining the diazo compounds obtainable from mononitroacetyl paraphenylenediamin having the formula:

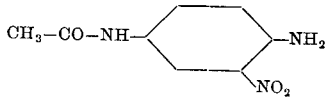

with amidonaphthol disulfonic acids in alkaline solution and then splitting off from the resulting dyestuffs the acetyl group by saponification.

The new dyestuffs are, in the shape of their alkaline salts, dark powders soluble in water. They yield upon suitable reduction with stannous chlorid and hydrochloric acid triamidobenzene and diamidonaphthol disulfonic acids. They dye unmordanted wool from acid-baths black shades.

In carrying out my process practically I can proceed as follows, the parts being by weight: 19.5 parts of mononitroacetyl-paraphenylenediamin having the above-given formula are diazotized in the usual manner by means of hydrochloric acid and seven parts of sodium nitrite, and the resulting diazo compound is added to a solution of 36.5 parts of the sodium salt, of 1.8-amidonaphthol-3.6-disulfonic acid, and twenty parts of sodium carbonate in two hundred parts of water. It is then stirred until the formation of the dyestuff be completed. When this point is reached, the dyestuff is precipitated by the addition of common salt, filtered off, and dried.

It dyes wool from acid-baths violet-red shades. The coloring-matter thus obtained is then heated to boiling with eight times its quantity of a fifty-per-cent sulfuric acid in order to split off the acetyl group. The new azo dyestuff thus produced deposits during the heating in a crystalline shape. It dyes unmordanted wool greenish blue-black shades.

The isolation of the intermediate product is not necessary. The acetyl group can also be split off by directly boiling the reaction mass with acids or alkalies.

The process proceeds in an analogous manner on using other amidonaphthol disulfonic acids, such as the 1.8-amidonaphthol-4.6-disulfonic acid, the 1.5-amidonaphthol-2.7-disulfonic acid, the 2.8-amidonaphthol-3.6-disulfonic acid, or the like.

The new dyestuff obtained according to the above-given example is, in the shape of its sodium salt, a black powder soluble in water with a bluish-violet color and soluble in concentrated sulfuric acid of 66° Baumé with a bluish-black color, which is changed into red by the addition of ice. It yields upon reduction with stannous chlorid and hydrochloric acid triamidobenzene and 1.7-diamido-8-naphthol-3.6-disulfonic acid and dyes unmordanted wool greenish blue-black shades.

Having now described my invention and in what manner the same is to be performed, what I claim as new, and desire to secure by Letters Patent, is—

1. The herein-described new azo dyestuffs obtainable by first combining the diazo compound of mononitroacetyl-paraphenylenediamin having the above-given formula with amidonaphthol disulfonic acids in alkaline solution and then splitting off the acetyl group by saponification, which dyestuffs are in the shape of their alkaline salts dark powders soluble in water; dyeing unmordanted wool black shades; and yielding upon reduction with stannous chlorid and hydrochloric acid triamidobenzene and diamidonaphthol-disulfonic acids, substantially as hereinbefore described.

2. The herein-described new azo dyestuff obtainable by first combining in alkaline solution the diazotized mononitroacetyl-paraphenylenediamin having the above-given formula with 1.8-amidonaphthol-3.6-disulfonic acid and then splitting off the acetyl group by saponification, which dyestuff is in the shape of its sodium salt a dark powder soluble in water with a bluish-violet color; being dissolved by concentrated sulfuric acid of 66° Baumé with a bluish-black color which is changed into red by the addition of ice; dyeing unmordanted wool greenish blue-black shades; and yielding upon reduction with stannous chlorid and hydrochloric acid triamidobenzene and 1.7-diamido-8-naphthol-3.6-disulfonic acid, substantially as hereinbefore described.

In testimony whereof I have signed my name in the presence of two subscribing witnesses.

MARTIN HERZBERG.

Witnesses:
OTTO KÖNIG,
J. A. RITTERSHAUS.